June 11, 1935.                P. DE LACY-MULHALL                2,004,194
                              VALVE CONTROLLING SYSTEM
                     Original Filed May 31, 1930   4 Sheets-Sheet 2

Inventor
Patrick DeLacy-Mulhall

Attorney.

June 11, 1935. P. DE LACY-MULHALL 2,004,194
VALVE CONTROLLING SYSTEM
Original Filed May 31, 1930  4 Sheets-Sheet 3
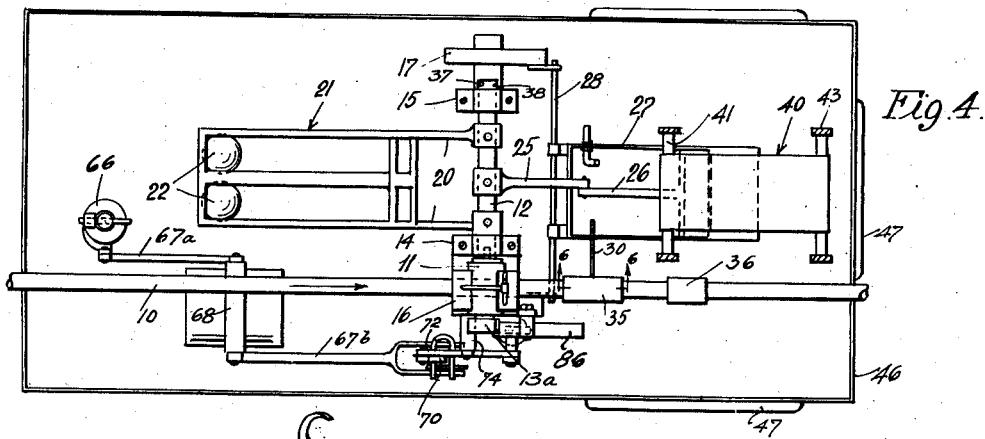
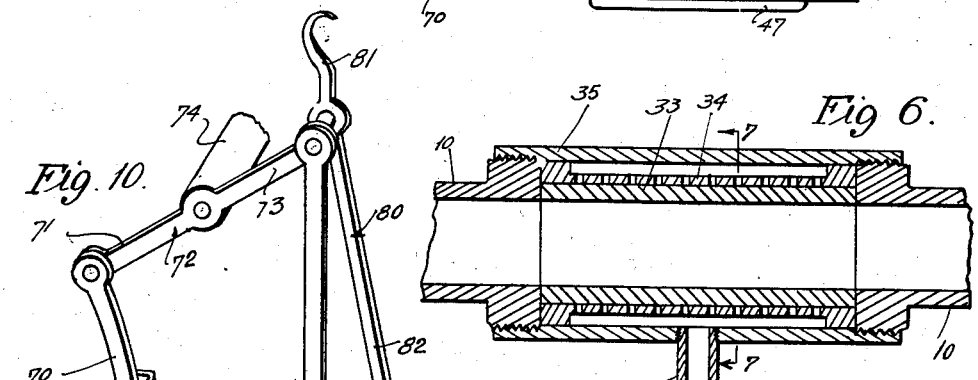
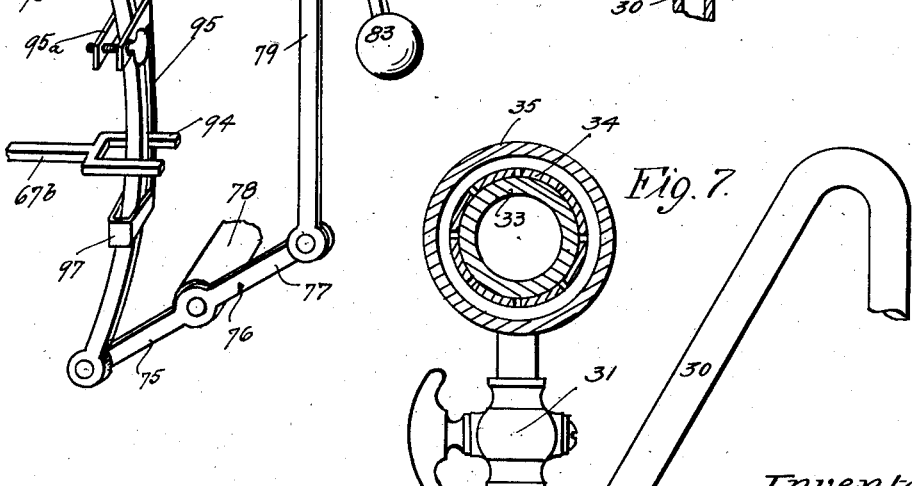
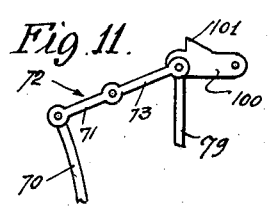
Inventor
Patrick Delacy-Mulhall.
Attorney.

June 11, 1935. P. DE LACY-MULHALL 2,004,194
VALVE CONTROLLING SYSTEM
Original Filed May 31, 1930 4 Sheets-Sheet 4
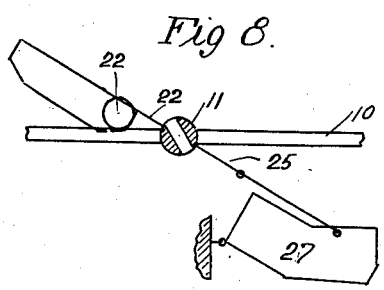
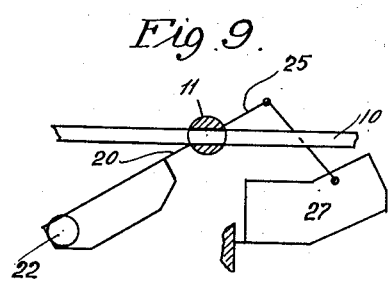
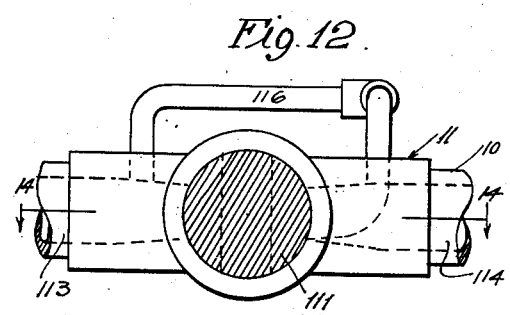
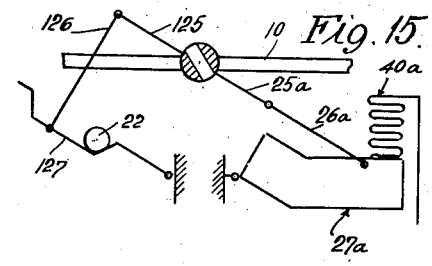
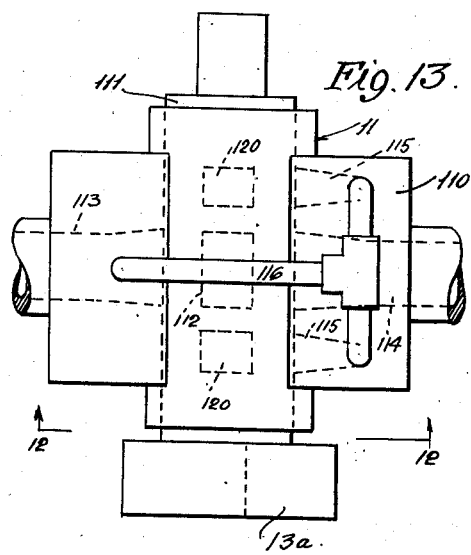
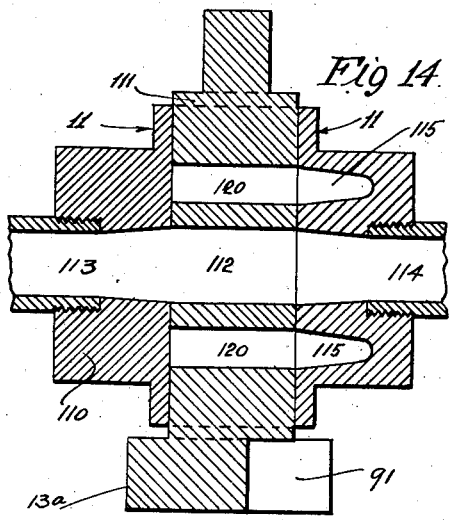
Inventor.
Patrick De Lacy-Mulhall.
Attorney.

Patented June 11, 1935

2,004,194

UNITED STATES PATENT OFFICE 2,004,194

VALVE CONTROLLING SYSTEM

Patrick De Lacy-Mulhall, Los Angeles, Calif.

Application May 31, 1930, Serial No. 458,093
Renewed October 31, 1934

11 Claims. (Cl. 137—146)

This invention relates generally to automatic devices for controlling the flow of liquids through conduits in predetermined response to varying conditions of flow requirement. The system herein to be described is designed for the automatic control of irrigation operations, although it will be apparent that the invention embodies subject matter that is applicable to a variety of other situations, and the invention is therefore not to be limited in any of such phases to the particular application herein set forth.

The present application is a continuation, in part, of my original application entitled "Quantity control apparatus," Ser. No. 311,548, filed October 10, 1928, now Patent No. 1,822,901, issued Sept. 15, 1931. The device herein described is within the broad scope of certain of the broader claims included in said original application, and includes certain specific subject matter shown but not claimed therein, which is claimed in the present application.

It is well known that irrigation requirements vary in direct and constant response to certain fluctuating natural phenomena that constitute what is collectively known as weather. All such phenomena as temperature, humidity, rain and snowfall, winds, etc., have a bearing, direct or indirect, upon the amount of irrigation that is required over any given period of time.

It is well known, for instance, that evaporation of water from the soil depends directly upon the humidity of the atmosphere, and hence that irrigation requirements vary with changing conditions of humidity.

It is also well known that the need for irrigation during rainfall, and for a certain period thereafter during which the soil remains moist, is entirely suspended, and any irrigation during such times represents waste.

It is also well understood that the most suitable time for irrigation is during the early hours of the morning, among the reasons for which being that at such time evaporation is at a minimum, and the maximum amount of water enters the soil.

It is the general object of the present invention to provide entirely automatic means for opening and closing a valve in an irrigation line under the cooperative control of all of the above referred to weather phenomena, whereby the actual conditions that determine the dryness of the soil determine also the amount of irrigating that is to be done, and whereby the irrigation operations are carried on under the most favorable conditions of temperature.

These and other features and specific objects of the invention, as well as the details as to how the above enumerated ends are accomplished, are left without further preliminary discussion to be explained in connection with the following detailed description of a present preferred embodiment of the invention, reference for this purpose being had to the accompanying drawings, in which:

Fig. 4 is a horizontal section taken on line 4—4 of Fig. 2;

Fig. 5 is a fragmentary section taken on line 5—5 of Fig. 1;

Fig. 6 is a section taken on line 6—6 of Fig. 4;

Fig. 7 is a section taken on line 7—7 of Fig. 6;

Fig. 8 is a diagrammatic view showing the closed-valve position of the weight and bucket arms;

Fig. 9 is a view similar to Fig. 8 but showing the open-valve position;

Fig. 10 is a perspective view of a portion of the temperature controlled timing device;

Fig. 11 is a fragmentary view showing a variational form of the temperature controlled timing device;

Fig. 12 is an elevation of a form of balanced control valve, being a view taken as indicated by line 12—12 of Fig. 13;

Fig. 13 is a plan view of the valve shown in Fig. 12;

Fig. 14 is a section taken as indicated by line 14—14 of Fig. 12; and

Fig. 15 is a diagrammatic view indicating variational forms of the device.

Figure 1:
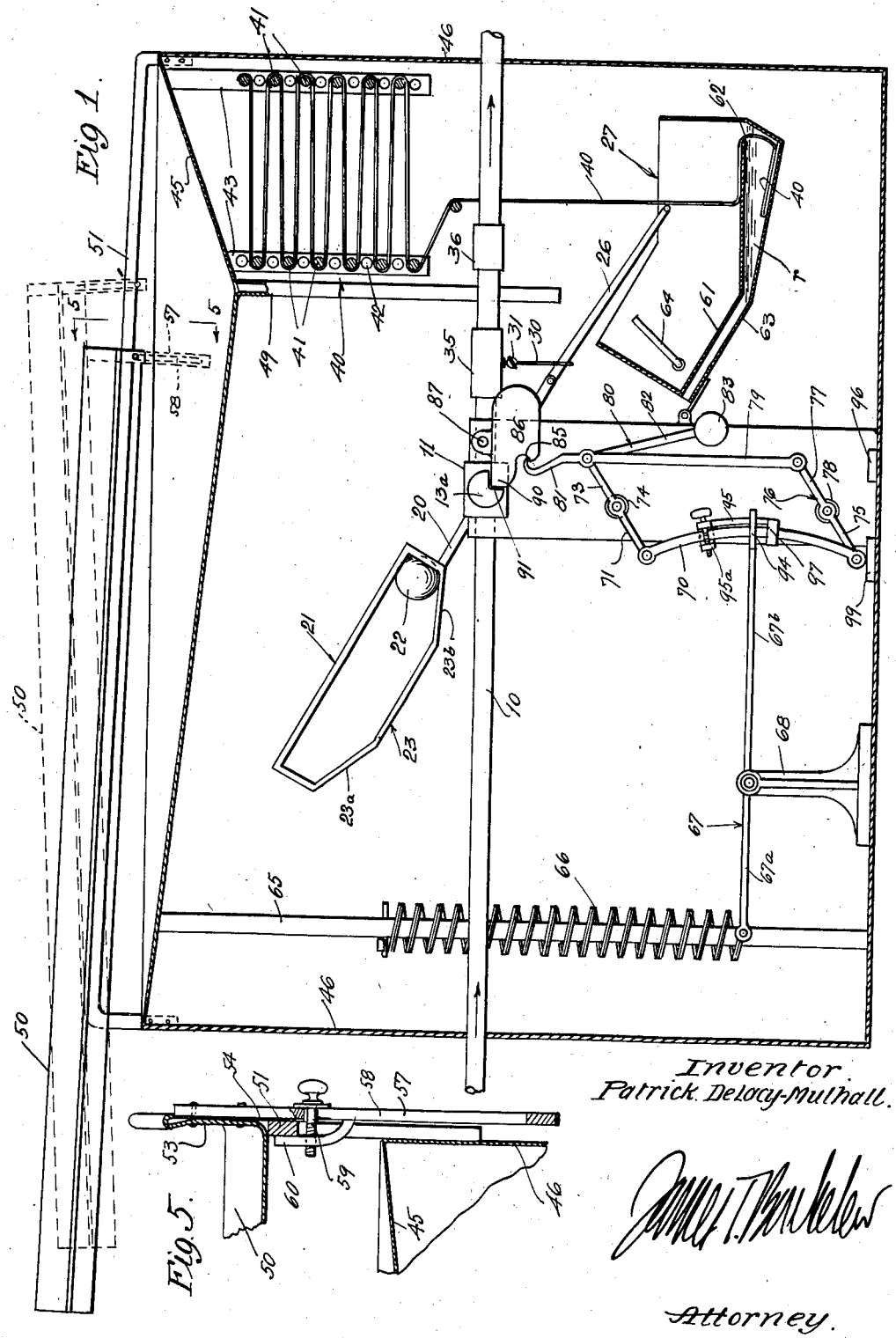
Fig. 1 is a side elevation of the device, one side of the enclosure being removed, and showing the parts in position to close the irrigation control valve.

In the drawings the irrigation pipe line is shown at 10, the direction of flow through said pipe line being indicated by the arrow. Pipe line 10 contains a control valve 11, a preferred form of which is later to be detailed, and controlling valve 11 is a horizontal operating shaft 12 connected to the valve stem, shaft 12 being rotatably mounted in bearings 14 and 15 provided on the upper ends of standards 16 and 17 respectively.

Mounted on shaft 12 and extending to one side thereof are a pair of arms 20 carrying a cage structure 21 providing parallel longitudinal race ways for ball weights 22. The longitudinal rods 23 on which the balls 22 run are provided with inclined sections 23a and 23b, as clearly shown in the drawings, for a purpose which will appear later in the description. The valve operating shaft 12 is thus provided with a laterally extending weight arm of variable moment depending upon the position of the balls 22 along the arm, and therefore upon the inclination of the arm (see Figs. 1 and 2).

Shaft 12 is also provided with an arm 25 extending oppositely to arms 20, and supported from the outer end of arm 25 is the bail 26 of a bucket 27. Bucket 27 is also supported, at its lower, inner edge, by means of a pivotal connection with a cross rod 28 extending horizontally between standards 16 and 17. It will be understood that movement of the weight and bucket arms acts to rotate shaft 12, which in turn operates valve 11 to control the flow through pipe line 10.

Figure 2:
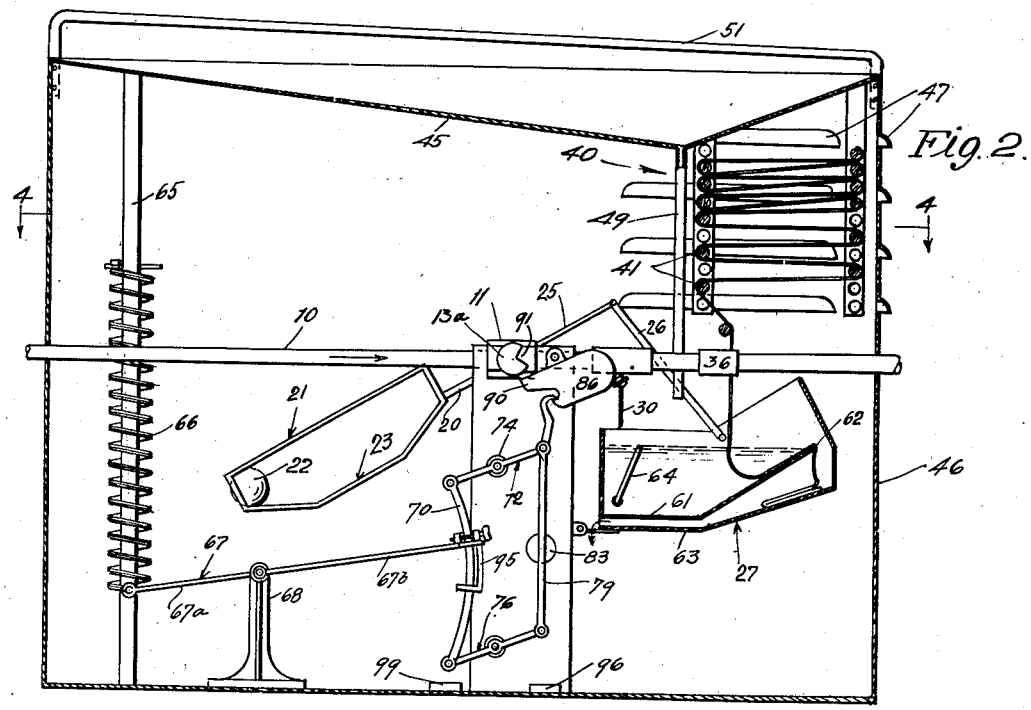
Fig. 2 is a similar view, but showing the parts in a position following that of Fig. 1 and in which the control valve has just been opened.
Figure 3:
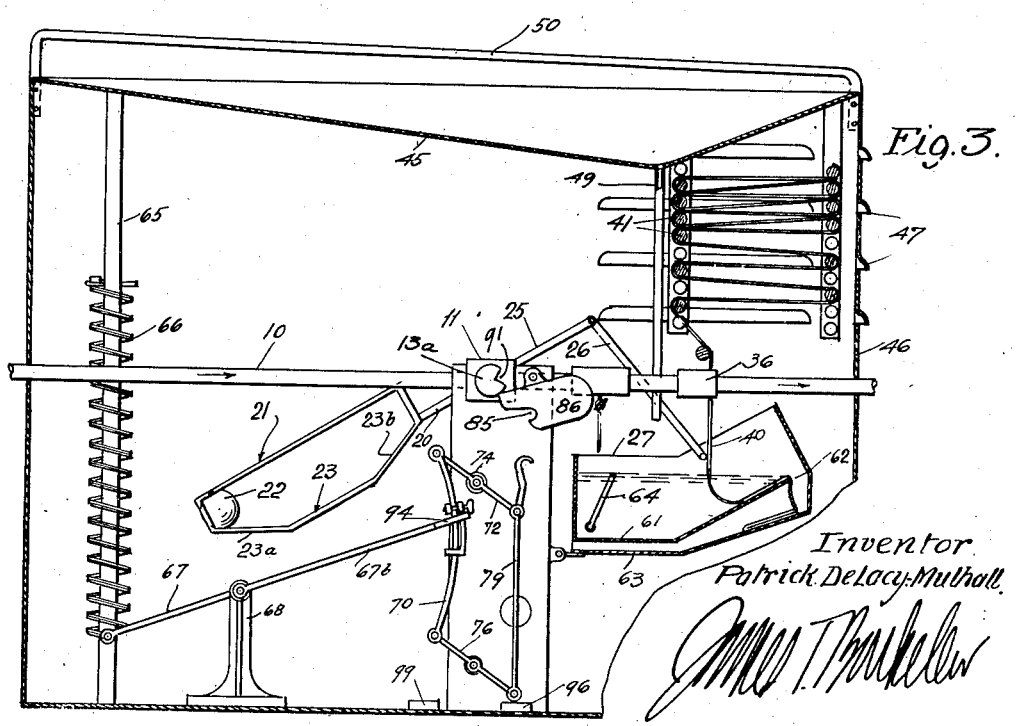
Fig. 3 is a view similar to Figs. 1 and 2, but showing a position following that of Fig. 2; the control valve still remaining open.

A drip-pipe 30 having a drip-cock 31 leads from pipe 10 at a point on the outlet side of valve 11, and is supported to discharge just within the rear pivoted edge of the bucket 27 when the bucket is elevated by arm 25 to its upward position, as illustrated in Figs. 2 and 3, but to discharge on the outside of the bucket when the bucket is dropped to its lower position, as illustrated in Fig. 1. The connection of the drip-pipe 30 with pipe line 10 is such as to prevent dirt or sediment carried by the water in the pipe line 10 from getting into the drip pipe 31 where it could clog up and interfere with the control system. This connection, shown in detail in Figs. 6 and 7, includes a porcelain tube 33, which is pervious to water, made up in the pipe line, and a perforated tube 34 surrounding the porcelain tube (or a perforated metal tube only) and communicating with a chamber provided by an outer pipe 35 and with which the drip pipe 30 communicates, all as will be clearly understood from references to Fig. 6.

When necessary a check valve, indicated at 36, is provided in pipe line 10 at a point located in the direction of flow from the connection of drip-pipe 31 with pipe line 10, this provision being made in situations in which the irrigation pipes are above valve 11, for the purpose of preventing water from backing up into the control apparatus when valve 11 is closed.

The motion of shaft 12 is preferably limited to a suitable angle by means of a pin 37 provided in shaft 12 and adapted to move between a pair of stop shoulders 38 provided in bearing 15, as shown in Fig. 4. The weight and the bucket arm are then so positioned on shaft 12 as to swing through substantially equal angles on each side of horizontal, valve 11 being one which may be operated by the angular rotation provided for the shaft 12, the valve being closed when the weight arm is up and the bucket arm down, and being opened when the arms are in reversed position, as indicated in the diagrams of Figs. 8 and 9, respectively.

Means for emptying bucket 27 of water discharged thereinto from drip-pipe 31 are provided as follows: The numeral 40 designates generally a water-evaporating wick, which consists of a long strip of fabric—preferably asbestos fabric—threaded back and forth between two horizontally spaced rows of vertically spaced, horizontal rods 41, which are removably fitted into sockets 42 provided in vertical supporting members 43, which supports may be hung from the slanting roof 45 forming a part of the enclosure for the device, said enclosure being more particularly described hereinafter. The lower end of this wick hangs in the bucket 27, and the water in the bucket travels up the wick and is evaporated into the atmosphere. There are preferably provided more sockets 43 than rods 41, so that a number of the rods 41 can be placed in adjacent sockets 43 while the balance of the rods are placed in alternate sockets, as in Fig. 4; and in this way the rate of evaporation from the portion of the wick strung on the adjacent rods 41 is greatly slackened, thus providing a simple means for varying the rate of evaporation from the wick and hence of dissipation of water from the bucket.

The characteristic operation of the system as so far described is as follows: Assuming bucket 27 to be empty, the downward moment on the weight arm is greater than that on the bucket arm, and the bucket arm is therefore forced up and the weight arm down, with the ball weight 22 resting on the outer end of the incline 23a, as in Fig. 2. This is the position illustrated in diagram in Fig. 9, and it will be seen that in this position the valve 11 is open and water is permitted to flow through pipe line 10. Drip-cock 31 is open sufficiently to allow a small proportion of the water flowing through pipe 10 to be diverted through the small drip-pipe 30 to discharge within bucket 27. During the time water is thus accumulating in bucket 27, water is also being dissipated therefrom by means of the wick 40, but this dissipation is slower than the rate of discharge into the bucket so that water accumulates in the bucket in accordance with the opening of drip-cock 31, which is set in accordance with the characteristics of operation desired, as will become more apparent as the description proceeds.

When sufficient water has accumulated in bucket 27, the moment on the bucket arm overbalances that due to weight 22 on the outer end of the weight arm, and the weight arm begins slightly to swing upwardly. As the weight arm rises, incline 23a reaches a horizontal position before the weight arm 20 itself does, and, as soon as incline 23a passes the horizontal position, ball 22 travels down the incline. The moment due to ball 22 is thus quickly reduced to a value substantially less than that of the counter-moment exerted upon the bucket arm, and the bucket arm therefore immediately descends and the weight arm rises, weight 22 traveling at once over the remainder of its track and coming to rest upon the inner end of incline 23b, the arms then being in the position of Fig. 1. The result of this movement of the weight and bucket arms is to rotate shaft 12 and thereby close valve 11, this position being illustrated in the diagram of Fig. 8.

The discharge from drip-pipe 30 is now cut off from the source of supply by valve 11, and fluid is prevented from backing up from the pipe line beyond the control apparatus by virtue of check valve 36. Water remaining in pipe 10 between valve 11 and the check valve is prevented from discharging into the bucket because the rear upper edge of the bucket has now passed away from its position inside and below the drip-pipe to the position of Fig. 1, and any further discharge from pipe 30 falls outside of the bucket. The discharge into bucket 27 is thus automatically cut off as the bucket moves to its lower position. The water accumulated in the bucket is now slowly discharged by means of wick 40, the rate of discharge depending upon the rate at which the water evaporates from the wick, and this in turn depending, first, upon the humidity of the atmosphere, and second, upon the adjustment of the wick, as previously described. As long as sufficient water remains in bucket 27 to overbalance the moment due to ball-weight 22 acting on the weight arm at the position of Fig. 1, the valve 11 is maintained in its closed position.

But when the quantity of water in the bucket has been sufficiently reduced due to evaporation from the wick, the weight-arm begins to tip downwardly, until the incline 23b has passed through the horizontal position, when the ball-weight travels in and down the incline, thereby positively overbalancing the bucket and swinging the arm, and then proceeds at once down the remainder of its track to the outer end of the incline 23a. The arms then assume their original position, indicated in Fig. 9, thus completing the cycle.

The bucket 27 preferably has a double bottom, as clearly shown in Figs. 1, 2 and 3, the first bottom 61 taking the discharge from pipe 30, and having a discharge edge 62 that is above the surface of the water in bottom 61 in the position of Fig. 3, but over which the water remaining in the bucket when the device tips from the position of Fig. 3 to the position of Fig. 1, pours to be caught by the second bottom 63 of the bucket. When, in the operation of the device, the bucket is again elevated, this residue of water, indicated at r in Fig. 1, pours out of the opening at the rear of the bucket between the first and second bottoms, as indicated by the arrow in Fig. 2. It will be obvious that this provision can be made to insure that the bucket is entirely empty when brought to elevated position, as well as causing the bucket to be kept washed clean of all dirt which might otherwise accumulate therein.

The water taken by the bucket may be considered as consisting of, first, a base load, or the amount of water filled into the bucket by the drip-cock, and sufficient to produce a moment capable of tipping the machine into the "closed" position. Obviously this base load can be made large or small to suit the needs of any particular case, a long load giving a long period of rest (and if necessary a long period of flow) and a small load the opposite. Second, there is the over-load, or amount of rainfall accepted by the bucket over and above the base load. The overload permits the prolongation of the period of rest which is desirable after extra heavy rainfall. The overload is controlled by an overflow tube 64 rotatably mounted in the side of the bucket. By rotating the tube the elevation of the upper end thereof is varied and the level of the over-load is controlled accordingly. This provision is of advantage because beyond a certain limit the lasting effects of rainfall do not increase proportionally to the amount of rain that falls. And included in these loads is the residue, which remains after the wick has removed sufficient of the base and overloads to cause the apparatus to tip to the "open-valve" position. One function of the residue is to insure a greater margin of safety in case of sticking or increased friction by providing an extra quantity of water for the wick to evaporate and thereby further increase the difference between the moments of the weight-arm and bucket arm, and the end of the wick is therefore placed on the bottom of the residue chamber between the inner and outer bottoms 61 and 63, as shown.

In Fig. 15 are diagrammatically shown variations which may be incorporated in the apparatus. As there shown the wick 40a is supported on and moves with the bucket 27a. The bucket arm 25a and bucket supporting link 26a are similar to the embodiment previously described, but in this case the weight arm is mounted similarly to the bucket arm. Thus, there is a weight arm 125 extending oppositely to the bucket arm 25a, and a link 126 pivoted at one end to the outer end of the weight arm, and pivoted at the other end to the ball race frame 127, which is pivoted at its inner end to a fixed support, as indicated. The advantage of this construction is the alternate straightening out of the pairs of arms 25a and 26a, and 125 and 126, limits the tipping motion of the apparatus in both directions. The wick here shown is carried down below the level of the bucket so as to give a siphon effect in draining the bucket.

The device as thus described will operate continuously, controlling the time intervals between flow periods according to the time required to evaporate sufficient water from the bucket for the arms to tip and thereby open the pipe-line valve, and the duration of the flow periods according to the rate of discharge from the drip-pipe 30. It is to be noted that both of these factors are variable, and further that each can be varied entirely independently of the other. And it is further to be noted that, having once set or adjusted the wick 40, the rate of evaporation from the bucket, and consequently the time between flow periods, will depend directly upon the humidity in the atmosphere, and hence indirectly upon the dryness of the soil, or in other words upon the need of irrigation. The device may be set to irrigate several times a day, or it may be set to irrigate only once over a period of days or of weeks. Let it be supposed it is set for a period of four days. In the latter case, during dry weather it may be that increased evaporation from the wick will cause the device to operate in three days or less, while during exceptionally moist weather it may be that the device will not operate until the fifth day or longer. The time interval between irrigation periods is thus directly dependent in length upon the moisture in the atmosphere, or in other words upon humidity.

The control valve 11 which I prefer to use in the pipe line is of the pressure-balanced or by-pass type and consists of a body 110 with a ported plug 111 rotatable therein to regulate the flow through the valve (see Figs. 12, 13 and 14). Thus, when the port 112 is horizontal, as in Fig. 14, the fluid passage between the inlet 113 and the outlet 114 is unobstructed and flow is a maximum. When the port 112 is vertical, as in Fig. 12 the flow is stopped; and in intermediate positions the flow may be varied from zero to its maximum value.

Since in practice the entire valve operating mechanism is built as small as possible, the valve should be easily operable and for this purpose it is desirable to reduce to a minimum the effort expended in turning the valve stem. A large share of this effort is expended in overcoming friction produced by the force of the water on the inlet side of the stem, and, to minimize this friction, means are employed to provide an equal and opposite pressure on the outlet side of the stem. I prefer to do this by providing two pressure chambers 115 in the body of the valve which are in communication with the inlet passage 113 by means of the pressure-communicating pipe 116. One such chamber is placed on each side of the outlet 114 with one end closed by the valve plug 111 so that the pressure against the valve plug is directed against that produced by the inlet 113.

The area of each one of the pressure chambers 115 is half of the area of the inlet passage 113, hence the total reactive force is equal and opposite to that in the passage 113.

When the valve 11 is opened and the water is freely flowing, the inlet pressure against the valve plug 111 drops to zero and to reduce the effective reactive force in the chambers 115 to zero, ports 120 are provided in the plug 111 in alinement with chambers 115 whereby the fluid pressure is transmitted through the valve plug to the body 110 of the valve and so rendered ineffective. It is also desirable that the inlet force and reactive force against the plug 111 balance in all intermediate positions between open and shut, i. e. that the total area of the ports 120 exposed to the chambers 115 change at the same rate as the area of the port 112 exposed to the inlet passage 113. This is most easily accomplished by making the ports 112, 120 of the same height and rectangular in section. When properly alined in the stem 111 the ports 112, 120 will all uncover at the same instant and will increase their exposed areas uniformly through the same arc, so that the hydrostatic forces on the valve plug will be equal and balanced for any position.

The device is preferably entirely enclosed within a casing 46, louvers 47 being provided in the sides of the casing to provide free circulation of air to and from the wick. Casing 46 has the inclined roof 45, the lowest point of which carries a discharge pipe or guide wire 49 discharging into bucket 27. In times of rainfall this inclined roof 45 catches water and discharges it through pipe 49 into the bucket 27, and it will be apparent that at such times the bucket will receive sufficient water from this source to hold the bucket arm down and valve 11 closed until the rain water collected in the bucket is discharged by means of the wick 40. The system is thus rendered sensitive to and entirely automatic for dry, damp or rainy weather. In dry weather, for instance, the system operates under the exclusive control of the drip-pipe and evaporation wick, the control valve being maintained alternately open and closed in accordance with the predetermined periods of flow and rest, the rest periods being preferably made responsive to humidity. During times of rainfall, however, the control valve is maintained closed under the superior control of the rain collecting roof or pan 45, which discharges sufficient water into the bucket to maintain it in the lowermost or closed-valve position. When the rainy condition has passed, the bucket can again empty and normal operation is resumed.

Now, the period of time for which the device will maintain control valve 11 closed following a period of rainfall depends upon the amount of water collected in the bucket, and therefore upon the area of roof 45 upon which the rain falls. I therefore provide over the inclined roof 45 a cover 50 which is adjustable in position to vary the effective area of the roof exposed to the rainfall. Normally this cover 50 rests upon inclined rails 51 (see Fig. 5), and it will be obvious that by sliding the cover back and forth along the rails the effective rain catching area of the cover and roof is varied. The two longitudinal side edges of cover 50 are bent upwardly as shown in Fig. 5, to provide upstanding flanges 53, and are then turned over and bent downwardly to provide depending sides 54 between which are confined the supporting rails 51, upon which the cover normally rests, as clearly shown in Fig. 5. The cover is shown resting along the rail 51 in the full line position of Fig. 1, and it will be seen that in this position rainfall caught by the cover will be discharged over its lower edge onto the slanting roof 45, the effective rain catching area of the device then being equal to the total area of the cover 50 plus the exposed area of roof 45. It is obvious that any rain catching area may be obtained, from nearly double the area of the roof 45 down to substantially the area of the cover 50 alone by thus moving the cover to a proper position relative to the roof 45.

Provision is also made for elevating the normally lower end of cover 50, as indicated in dotted lines in Fig. 1, and in such a case the area of the cover subtracts from the area of the roof 45. For this purpose there is affixed to the normally lower end of cover 50, a pair of depending supports 57 (see Fig. 5), each of which has a vertical slot 58 through which passes a clamping screw 59 to screw thread into a nut member inside of rail 51. When the cover is in the normal position of Figs. 1 and 5 it rests down upon the rail 51 and the screw 59 passes through the upper end of the slot 58. To elevate the cover to the dotted line position of Fig. 1, screw 59 is loosened and the normally lower end of the cover elevated, when the screw may be again tightened with the cover supported by the member 57, which in turn is clamped to rail 51. By these provisions any effective rain catching area, from nothing up to nearly twice the area of the roof, is available.

These rain catching provisions also collect moisture by condensation from the atmosphere when humidity is high, and at such times this moisture is delivered to the bucket and serves to prolong the period before the valve is next opened. Thus, whenever moisture is precipitated from the atmosphere, whether by rainfall or condensation, the time between irrigation operations is prolonged.

And it is obvious that the rain catching roof may be placed at the sprinkled area, where water from the sprinkler heads falls upon the roof and is carried to the bucket. In such an arrangement the drip pipe leading from the pipe line to the bucket may be dispensed with.

Means now to be described are provided for causing the device to open the control valve only upon increase in temperature, which is ordinarily the increase in temperature that takes place in the early hours of the day. The preferred means for accomplishing this purpose are embodied as follows:

Surrounding and affixed at its upper end to a vertical post 65 supported within the enclosure 46 is a bi-metallic thermostatic coil 66, the lower end of which is attached to the end of one arm of a lever 67 pivoted intermediate its ends upon a mount 68, the end of the other arm of this lever having a lost-motion slip connection with a bow shaped rod 70, as later to be described in more detail. The upper end of bow 70 is pivoted to an arm 71 of a lever 72, lever 72 being pivotally mounted upon a post 74 extending from the supporting standard 16. The lower end of bow 70 is similarly pivoted to the arm 75 of a lower lever 76, which is pivotally mounted upon a post 78 extending from standard 16. A link 79 is pivoted at its upper end to the other arm 73 of lever 72, and at its lower end to the other arm 77 of lever 76.

Pivotally mounted at the pivotal connection of lever arm 73 with link 79 is a lever 80 embodying an upwardly extending arm in the form of a hook 81, and a depending arm 82 carrying a weight 83. The parts being in the position of Fig. 1, hook 81 is in engagement with a notch 85 provided in the edge of a locking element 86, which element is pivotally mounted at 87 upon the upper end of standard 16. In the arrangement illustrated, the locking element 86 is eccentrically weighted so as to have a constant tendency to swing right handedly from either of the positions of Fig. 1, 2 and 3; while the hook 81 which in the position of Fig. 1 is forced into engagement with notch 85 because of the moment of weight 83, is adapted to be pulled downwardly by movement of lever 72 to rotate the element 86 in a left handed direction, as from the position of Fig. 1 to position of Fig. 2.

In Fig. 1 the end 90 of the locking element is taken within a notch 91 provided in the valve actuating stem 13a extending forwardly from the plug of valve 11, thus locking the valve 11 and actuating shaft 13 in the closed valve position of Fig. 1 and positively preventing movement of the weight and bucket arms.

Assuming the parts to be in the position of Fig. 1 and thermostatic coil 66 to be in contracted position, as the temperature increases coil 66 expands and moves the arm 67a of lever 67 downwardly toward the position of Fig. 2. This causes the other arm 67b of lever 67 to move upwardly, and its bifurcated tip 94 to engage the cross strap 95a of a slip-clamp 95 clamped on bow 70, but slidable thereon when bow 70 is held.

Bow 70 is thus moved upwardly under the actuation of the rising lever arm 67b and clamp 95, and the pivotal connection of lever arm 73 with lever 80 moves downwardly and causes the hook 81 of lever 80 to pull downwardly on the locking element 86. Element 86 accordingly swings left handedly toward the position of Fig. 2, in which position the locking element is clear of the notch in the valve stem 13a. Assuming bucket 27 to be sufficiently empty, it will then rise and the weight arm of the device will descend, thereby operating shaft 13 to open valve 11. The parts are then all in the position of Fig. 2. In case bucket 27 is not sufficiently empty to elevate when the locking element 86 is removed from the valve stem, the bucket and weight arms, will, of course, not shift, but will shift at some subsequent unlocking of the valve stem when sufficient water has been dissipated from the bucket so that it will be overbalanced by the weight arm, as will later become more apparent.

Assuming, however, that the bucket 27 did rise to the position of Fig. 2 and valve 11 was opened, then as the temperature further increases the thermostat further swings the linkage 76, 72 76, 79 in the same direction until hook 80 slips out of the notch 91 in the eccentrically weighted locking element, which element thereupon swings back toward its original position. The valve stem 13a now being rotated, however, the locking element cannot enter the notch 91 but comes into engagement with the rounded side of the stem, as shown in Fig. 3.

The linkage then swings onwardly with further increase in temperature until the connection of link 79 with lever arm 77 is stopped by the stop 98, after which the clamp slips on bow 70 to take care of further movement of lever arm 67b.

The parts then being in the position of Fig. 3, valve 11 remains open and water flows through pipe line 10 until sufficient water is accumulated in bucket 27 to overbalance the weight arms of the device, when the bucket and weight arms shift back to the position of Fig. 1 and close valve 11. This causes valve stem 13a to return to its original position and the locking element 86 slips back into place within its notch 91. Thereafter wick 40 acts to drain the accumulated water from the bucket, but the bucket cannot again rise until the hook is again moved downwardly to remove the locking element 86 from engagement with the notch of the valve stem.

The coil 66 and linkage 67, 70, 72, 76, 79 still being in the position shown in Fig. 3, as the temperature then begins to decrease the coil 66 slowly contracts and lever arm 67b is moved gradually downwardly. In so doing it moves for a short distance before engaging the lower cross strap 97 of the slip clamp connection with bow 70, and then acts through the clamp to swing the linkage 70, 72, 76, 79 back toward the original position of Fig. 1. It will be seen that there is provided a lost motion connection between lever arm 67b and bow 70, and that there is thus provided a limited range through which lever arm 67b may oscillate with small temperature fluctuations without actually operating the control mechanism.

In this return movement the bow 70 is moved downwardly into engagement with a stop block 99, after which the clamp slips on the bow to take care of the remaining movement of the lever with further decrease in temperature. And during this return movement the hook 81 mounted on the rising lever arm 73 slips back into the notch 85 of the locking element.

The device is then back in the original position of Fig. 1, and is in condition to be operated to effect another opening of valve 11 at the next increase in temperature that is sufficient to unlock the valve.

Briefly summing up, these provisions cause the valve 11 to be unlocked upon each increase in temperature of sufficient predetermined magnitude, which is ordinarily the increase in temperature occurring in the early part of each day. If sufficient water has been removed from the bucket when the valve is so unlocked, the weight arms will overbalance the bucket arm and swing the arms to open the control valve in the pipe line. If, on the other hand, sufficient water remains in the bucket to overbalance the weight arm, the arms will not tip and the valve will remain closed, though temporarily unlocked. Upon further increase in temperature, in either case, the hook 81 finally releases the locking element 86, which swings back against the valve stem. If the device is now in the closed valve position the locking element immediately enters the notch in the valve stem, to lock the valve in that position, while if the device is in open valve position the locking element will press against the rounded surface of the stem until the bucket has collected sufficient water to overbalance the weight arms and the device swings back to the first position, when the locking element enters the valve stem notch to lock the valve closed. The device, in this form, thus will permit ordinarily of but one opening of the valve before the locking element is released to hold the valve closed for the balance of the day.

In Fig. 11 is shown a form in which the valve, after once being unlocked with a rise in temperature at the beginning of the day, remains open until a corresponding fall in temperature takes place at the end of the day, so that any number of openings of valve 11 may be effected during the day, dependent only upon the adjustment of other factors of the system. (Or this may be reversed and the open condition made to occur on falling temperature during evening and night.)

In Fig. 11 the pivotal connection of lever arm 73 with link 79 is shown pivotally connected with the swinging end of a pivoted arm 100, which arm has a lug 101 adapted to engage the valve stem notch 91. It will be understood that arm 100 swings downwardly with motion of the linkage due to increasing temperature, and thereby moves to take its lug 101 clear of the valve stem to unlock the valve, and to move back with decreasing temperatures to lock the valve in closed position.

With either of these forms of valve locking means it will be obvious that the valve is automatically unlocked every morning. But it is not necessarily true that the valve will open every morning when unlocked, for the period between openings may be set for an average of any number of days, so that the valve will open only when the temperature controlled locking means is unlocked and at the same time sufficient water has been removed from the bucket to allow it to be overbalanced by the weight arms.

The device is completely responsive to all known weather conditions that affect the needs for irrigation. When the humidity is high, for instance, irrigation needs are correspondingly low due to reduced evaporation from the soil and reduced transpiration from the plants, and the device takes care of this condition by increasing the time between valve openings by reason of slower evaporation from the bucket. And this function is aided by the condensation of moisture from the atmosphere upon the cover of the device and the delivery of this moisture into the bucket, where it serves to prolong the time between valve openings. And during times of rain or snow fall, the rain cover collects water and discharges it into the bucket to postpone the next opening of the valve until such time as the water thus collected has evaporated, sufficient water being thus collected in the bucket to hold the device inoperative until the soil has had time to dry out and require further irrigation.

The quantity of water that passes through valve 11, and the periods during which it flows, are therefore directly determined by and are proportional to those weather conditions which determine the actual needs for irrigation.

And with the use of the temperature actuated means for locking and unlocking the valve, the irrigation operations, thus properly determined in measure, are confined to those times of the day at which temperature conditions are most suitable.

I claim:

1. In combination with a conduit having a control valve, valve operating means for alternately opening and closing said control valve, said means including a valve operating shaft, a swinging weight arm mounted on said shaft, a weight carried by the weight arm, a swinging bucket-arm mounted on the shaft and extending oppositely to the weight arm, means for diverting fluid from the conduit into the bucket, and means for dissipating fluid from the bucket; releasable locking means adapted to hold said valve closed against said operating means, and temperature controlled means for operating said valve locking means to cause release of the valve.

2. In combination with a conduit having a control valve, valve operating means for alternately opening and closing said control valve, said means including a valve operating shaft, a swinging weight arm mounted on said shaft, a weight carried by the weight arm, a swinging bucket-arm mounted on the shaft and extending oppositely to the weight-arm, means for diverting fluid from the conduit into the bucket, and means for dissipating fluid from the bucket; releasable locking means adapted to hold said valve closed against said operating means, and means responsive to rise of temperature for operating said valve locking means to cause release of the valve.

3. In combination with a conduit having a control valve, valve operating means for alternately opening and closing said valve, said means including a valve operating shaft, a swinging weight arm mounted on said shaft, a weight carried by the weight-arm, a swinging bucket-arm mounted on the shaft and extending oppositely to the weight-arm, means for diverting fluid from the conduit into the bucket, and means for dissipating fluid from the bucket; a locking element for holding said valve against said operating means, and means responsive to predetermined rise of temperatures for causing said locking element to release said valve, and responsive to further rise of temperature to cause re-locking of said valve.

4. In combination with a conduit having a control valve, valve operating means for alternately opening and closing said valve, said means including a valve operating shaft, a swinging weight arm mounted on said shaft, a weight carried by the weight arm, a swinging bucket-arm mounted on the shaft and extending oppositely to the weight-arm, means for diverting fluid from the conduit into the bucket, and means for dissipating fluid from the bucket; a locking element for holding said valve closed against said valve operating means, said locking element constantly yieldingly urged to locking position, and means responsive to predetermined rise of temperature for moving said locking element to release said valve, and responsive to further rise of temperature to release said locking element to move back to locking position.

5. In combination with a conduit having a control valve, valve operating means for alternately opening and closing said valve, said means including a valve operating shaft, a swinging weight arm mounted on said shaft, a weight carried by the weight arm, a swinging bucket-arm mounted on the shaft and extending oppositely to the weight arm, means for diverting fluid from the conduit into the bucket, and means for dissipating fluid from the bucket; a locking element for holding said valve closed against said valve operating means, said locking element constantly yieldingly urged to locking position, a thermostat movable with change of temperature, and a connection between said thermostat and said locking element whereby rise of temperature causes said locking element to move to release said valve.

6. The herein described method, that includes holding an irrigation control valve closed by virtue of the accumulation of water collected from the atmosphere, opening said valve by virtue of the evaporation of collected water into the atmosphere, and controlling the time of opening of said valve with temperature.

7. The herein described method that includes holding an irrigation valve closed by virtue of the accumulation of water diverted from the main stream through the valve, adding to said accumulation water collected from the atmosphere, opening said valve by virtue of the evaporation of said accumulated water into the atmosphere, and controlling the time of opening said valve with temperature.

8. In apparatus of the character described, mechanism for supplying water for irrigation purposes, means urging said mechanism toward water supplying position, and means for controlling said urging means, including means responsive to the evaporation of moisture into the atmosphere, and means responsive to diurnal temperature variations.

9. In apparatus of the character described, a valve for supplying water for irrigation purposes, means for locking the valve in closed position, means responsive to diurnal temperature variations for releasing the lock, means urging the valve toward opening position, and means responsive to atmospheric moisture conditions for causing said urging means to operate during the period that the lock is released.

10. In an irrigation system having a valve for supplying water, that method which comprises opposing the effects of accumulation of moisture from the atmosphere and of the evaporation of moisture into the atmosphere, and operating the valve when the integrated evaporation substantially exceeds the integrated accumulation.

11. In apparatus of the character described, mechanism for supplying water for irrigation purposes, means urging said mechanism toward water supplying position, and means for controlling said urging means, comprising means forming a water receptacle, means for evaporating said water, and means acting in response to the integrated evaporation of the water as compared with the water accumulated in the receptacle for operating said urging means.

PATRICK DE LACY-MULHALL.